(12) United States Patent
Kuehner (10) Patent No.: US 9,042,929 B2
(45) Date of Patent: May 26, 2015

(54) TRUNKED AND BROADBAND RADIO COMMUNICATION METHOD AND SYSTEM

(71) Applicant: MOTOROLA SOLUTIONS, INC., Schaumburg, IL (US)

(72) Inventor: Nathanael P. Kuehner, Rolling Meadows, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 109 days.

(21) Appl. No.: 13/971,200

(22) Filed: Aug. 20, 2013

(65) Prior Publication Data
US 2015/0057040 A1     Feb. 26, 2015

(51) Int. Cl.
- *H04B 7/00* (2006.01)
- *H04W 72/04* (2009.01)
- *H04W 4/08* (2009.01)

(52) U.S. Cl.
CPC ............. *H04W 72/048* (2013.01); *H04W 4/08* (2013.01)

(58) Field of Classification Search
CPC ..... H04W 24/00; H04W 4/10; H04W 76/005; H04W 28/20; H04W 28/26; H04W 72/0453; H04W 48/12; H04W 72/04; H04W 24/02; H04W 24/08; H04W 72/005; H04W 36/0072; H04W 4/08; H04L 12/189; H04L 45/22; H04L 41/0823; H04L 43/0894; H04L 1/0006; H04L 63/1416; H04L 12/581; H04L 65/103; H04M 7/0057; H04M 3/42; H04M 3/42374; H04M 2207/18
See application file for complete search history.

(56) References Cited

U.S. PATENT DOCUMENTS

| | | | |
|---|---|---|---|
| 7,343,163 B1 * | 3/2008 | Perkins et al. | ............. 455/452.1 |
| 8,195,215 B2 | 6/2012 | Marocchi et al. | |
| 8,335,533 B2 * | 12/2012 | Chion et al. | .................. 455/519 |
| 2002/0142767 A1 * | 10/2002 | Mears et al. | .................. 455/426 |
| 2008/0004054 A1 | 1/2008 | Barbaresi et al. | |
| 2009/0291704 A1 | 11/2009 | Korus et al. | |
| 2012/0115494 A1 | 5/2012 | Christensen et al. | |
| 2012/0172083 A1 | 7/2012 | Logalbo et al. | |

(Continued)

FOREIGN PATENT DOCUMENTS

| | | |
|---|---|---|
| EP | 2553916 A1 | 2/2013 |
| WO | 2006094087 A2 | 9/2006 |
| WO | 2009089908 A1 | 7/2009 |

(Continued)

OTHER PUBLICATIONS

International Search Report Mailed Nov. 27, 2014 Counterpart to PCT/US2014/049701.

(Continued)

*Primary Examiner* — Golam Sorowar
(74) *Attorney, Agent, or Firm* — Daniel R. Bestor (57) ABSTRACT

A data communication system and a method of data communication. The method comprises receiving data associated with a plurality of users, wherein a first set of the plurality of users is located at a first location and a second set of the plurality of users is located at a second location. The method further comprises determining that the first set of users has access to both a broadband data communication system and a trunked radio system and that at least one user of the second set of users does not have access to the broadband data communication system. The data is then provided to the first set of users by the broadband data communication system and not the trunked radio system, and to the second set of users by the trunked radio system and not the broadband data communication system.

19 Claims, 7 Drawing Sheets

(56) References Cited

U.S. PATENT DOCUMENTS

2012/0178442 A1 7/2012 Martinez et al.
2013/0005391 A1 1/2013 Niass et al.

FOREIGN PATENT DOCUMENTS

WO 2012018501 A1 2/2012
WO 2012082643 A1 6/2012

OTHER PUBLICATIONS

Aiache H. et al: Increasing Public Safety Communications Interoperability: The Chorist Broadband and Wideband Rapidly Deployable Systems, Jun. 14, 2009 pp. 1-6.

Pappas et al.,: "Method for optimal audio routing for PSI Dual Device public safety users", IP.com, Nov. 1, 2010.

* cited by examiner

TRUNKED AND BROADBAND RADIO COMMUNICATION METHOD AND SYSTEM

BACKGROUND OF THE INVENTION

Land mobile radio (LMR) systems are wireless communications systems that typically include at least one base station and a plurality of mobile terminals, where the plurality of mobile terminals are able to communicate with each other by the at least one base station. Often a network of interconnected base stations is used to connect mobile terminals across a large geographical area.

LMR is popular for military, law enforcement and emergency response applications, and is also popular with certain commercial entities, as it provides an efficient means of communication to a large number of users. Modern LMR systems involve trunked radio communication. In trunked radio systems, a pool of channels is centrally maintained, and channels are allocated dynamically to groups of users, when required. Trunked radio systems are more efficient than systems that provide static channel allocations, as resources can be shared among groups of users as needed.

A problem with trunked radio LMR systems of the prior art is that a number of useable channels is inherently limited. When all channels are allocated, any further communication requests are either denied or queued until channels become available again.

Attempts have been made to utilize other communications systems together with LMR. These attempts have included providing push-to-talk (PTT) functionality using alternative broadband data communication networks. In certain systems, the PTT functionality is linked to the LMR network, perhaps via the Internet, enabling LMR and PTT devices to communicate with each other.

However, a problem with combining LMR and broadband PTT functionality using alternative data communication networks is that network resources may not be used efficiently. For example, a user may interact with an LMR channel using both an LMR device and a mobile broadband device including PTT functionality, which can be both distracting and inefficient. Similarly, some users may interact using LMR, whereas others interact using broadband PTT, which can result in an increase in resource utilization as both LMR and broadband PTT resources are required.

Accordingly, there is a need for an improved trunked radio communication system and method.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to one aspect, a method of data communication comprises: receiving data associated with a group of radios, wherein a first subset of the group of radios is located within a first region and a second subset of the group of radios is located within a second region; determining, at a call controller, that the first subset of radios has access to both a broadband data communication system and a trunked radio system; determining that at least one radio included in the second subset of radios does not have access to the broadband data communication system; and allocating resources in the first region on the broadband data communication system and in the second region on the trunked radio system, and subsequently providing the data to the first subset of radios by the data communication system and not the trunked radio system and to the second subset of radios by the trunked radio system and not the data communication system.

Figure 1:
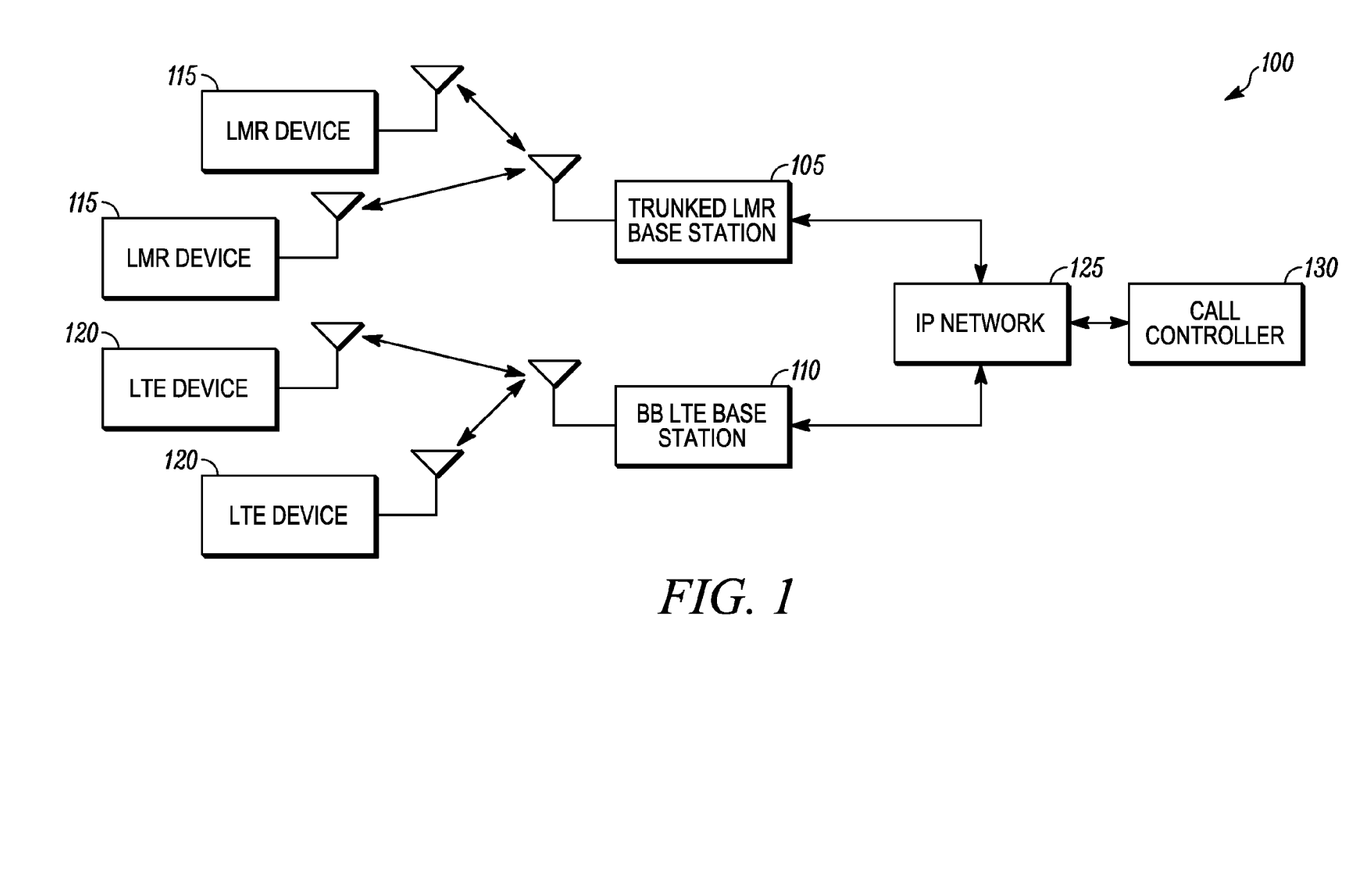
FIG. 1 is a block diagram of a communications system, in accordance with some embodiments.

FIG. 1 is a block diagram of a communications system 100, according to an embodiment of the present invention. The communications system 100 includes one or more trunked Land Mobile Radio (LMR) base stations 105, one or more broadband $3^{rd}$ Generation Partnership (3GPP) Long Term Evolution (LTE) base stations 110, and a group of radios in the form of a plurality of LMR devices 115 and a plurality of LTE devices 120.

The one or more trunked LMR base stations 105 and the one or more broadband 3GPP LTE base stations 110 are connected to an internet-protocol (IP) network 125, such as the Internet. This enables the LMR devices 115 and the LTE devices 120 to communicate with each other and/or with one or more external devices or systems (not shown).

The base stations 105 and/or the base stations 110 can also be referred to as base radios, repeaters, access points, or equivalents thereof. The base stations 105 and/or the base stations 110 generally include, for example, a repeater and a router and can also include other elements to facilitate the communications between the LMR devices 115, the LTE devices 120 and the IP network 125.

The communications system 100 further includes a call controller 130, connected to the IP-network 125. The call controller 130 can perform various functions, discussed in further detail below, including management of communication between the LMR devices 115 and the LTE devices 120, as well as managing resources in the communications system 100. The call controller 130 can be used to manage group voice calls, or any other type of communication to or from the LMR devices 115 and/or the LTE devices 120. The call controller 130 may also store associations between trunked (LMR) devices and broadband (LTE) devices by, for example, mapping device identifiers of the trunked (LMR) devices with device identifiers of the broadband (LTE) devices, or by some other mechanism.

The call controller 130 can be distributed, and comprises call control modules that are interconnected using the IP-network 125. Alternatively or additionally, the call controller 130 can comprise one of a plurality of call controllers that are connected by the IP-network 125.

As will be readily understood by a person of ordinary skill in the art, further elements can be present in the communications system 100 to facilitate communication between the LMR devices 115 and the LTE devices 120. Examples of such elements include decoders, encoders and transcoders, which are configured to encode, decode and/or transcode data from one of the LMR devices 115 to one or more of the LTE devices 120, or from one of the LTE devices 120 to one or more of the LMR devices 115.

According to certain embodiments, some users have access to both an LMR device 115 and an LTE device 120. For example, an LMR device 115 and an LTE device 120 can be incorporated into a single physical converged device, sharing one or more components such as a power source. Alternatively, an LMR device 115 and an LTE device 120 can comprise independent devices, which can, for example, be paired with each other, in close proximity to each other, or linked to each other by the user, or otherwise associated with one another or with a same vehicle, or via some other mechanism. As discussed further below, the call controller 130 can direct one of the LMR devices 115 or one of the LTE devices 120 to receive data, in order to, for example, more efficiently utilize network resources.

The LMR devices 115 and the LTE devices 120 can each be, for example, a portable/mobile radio, a personal digital assistant, a cellular telephone, a video terminal, a portable/mobile computer with a wireless modem, or any other wireless communication device. Such devices are also referred to in the art as subscriber units (SUs), mobile stations, mobile equipment, handsets, mobile subscribers, or an equivalent.

Upon reception of data, one or more of the LMR devices 115 and the LTE devices 120 are directed to connect to the respective trunked LMR base station 105 or the broadband LTE base station 110. The same received data, or variants of the same received data, can be supplied to LMR devices 115 and LTE devices 120 by respective networks.

The term data can, for example, include voice data packets of a voice call or data packets representing text, images, audio or video. Thus data communication can include transmission and/or reception of any such data.

In the case of a user (or vehicle, or other entity) being associated with both an LMR device 115 and an LTE device 120, the received data is advantageously only supplied to one of the LMR device 115 and the LTE device 120. In such case, the call controller 130 can determine which of the LMR device 115 and the LTE device 120 is to be used for supplying the received data.

As will be readily understood by a person of ordinary skill in the art, the communications system 100 illustrated in FIG. 1 is a simplified representation of one particular communications system configuration, and many other configurations are possible.

Figure 2:
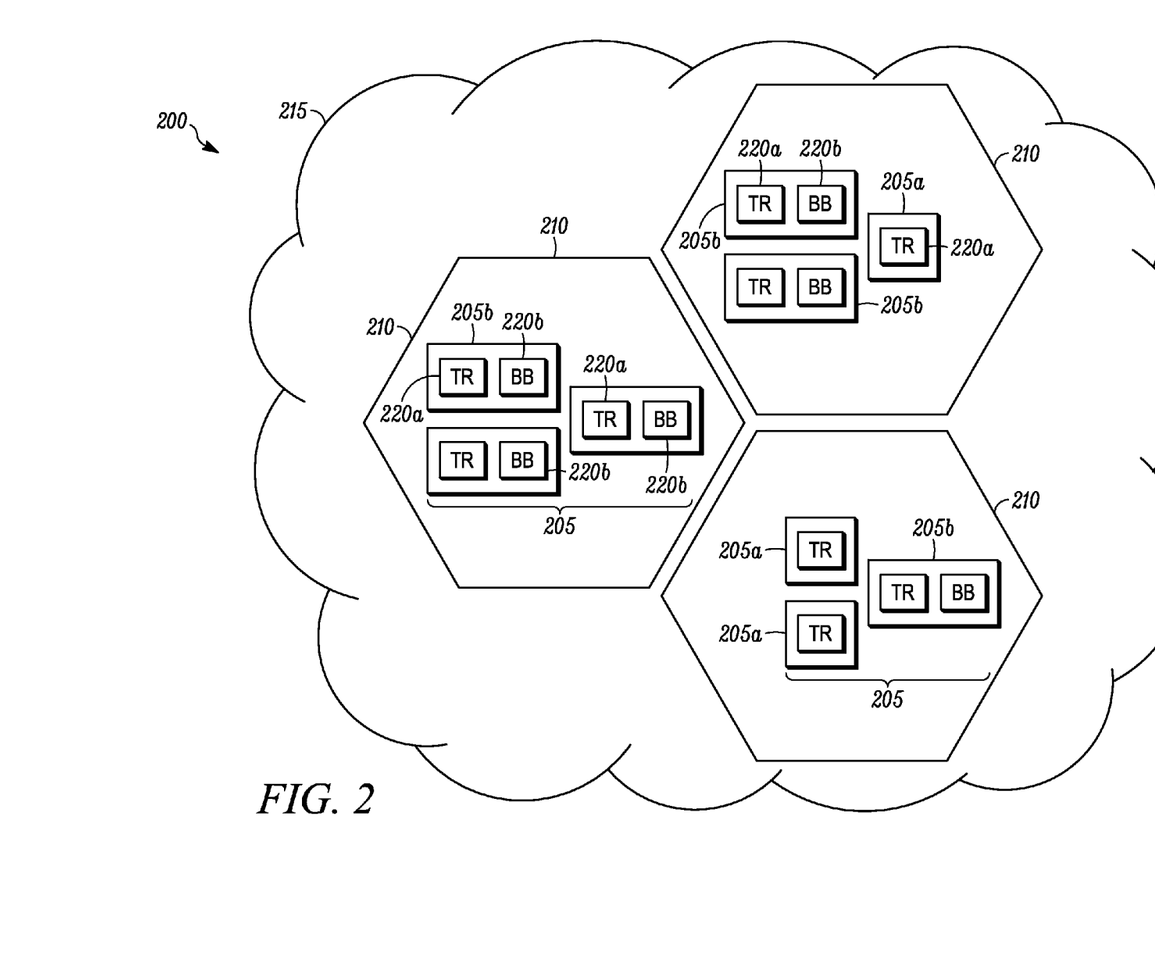
FIG. 2 is a further diagrammatic illustration of a communications network, in accordance with some embodiments.

FIG. 2 is a diagrammatic illustration of a communications system 200, according to an embodiment of the present invention. The communications system 200 may be similar to the communications system 100 of FIG. 1.

The communications system 200 includes a plurality of radios 205, which are able to communicate with each other, in various ways, as discussed below. The plurality of radios 205 can be public safety devices that, for example, enable voice data communication and/or video data communication between public safety professionals.

The communications system 200 includes a trunked LMR network defined by a plurality of LMR sites 210, and a broadband data network with a corresponding data network coverage area 215. Each LMR site 210 can be associated with, for example, an LMR base station (not shown), such as the trunked LMR base station 105 of FIG. 1, and the data network coverage area 215 can be associated with one or more cellular base stations (not shown), such as the broadband LTE base station 110 of FIG. 1.

The plurality of radios 205 include LMR-only devices 205a, each of which includes an LMR component 220a enabling the LMR-only devices 205a to communicate with each other using the LMR network. The plurality of radios 205 further includes combined LMR-broadband devices 205b, which include the LMR component 220a and a broadband push-to-talk (PTT) component 220b. The presence of the LMR component 220a and the broadband PTT component 220b enables the combined LMR-broadband devices 205b to communicate with each other using either the trunked LMR network or the broadband data network (e.g., an LTE network or other broadband network), or with LMR-only devices 205a using the trunked LMR network.

As illustrated in FIG. 2, the broadband data network coverage area 215 and the plurality of sites 210 overlap. Thus the combined LMR-broadband devices 205b are able to receive data using either the LMR network or the broadband data network. In such case, a call controller (not shown), such as the call controller 130 of FIG. 1, can determine whether data is to be transmitted to the combined LMR-broadband device 205b using the trunked LMR network or the broadband data network of the communications system 200.

According to certain embodiments, data is then transmitted to the combined LMR-broadband devices 205b using the determined trunked LMR network or broadband data network. According to alternative embodiments, the combined LMR-broadband devices 205b are directed, for example by the call controller, to connect to either the trunked LMR network or the broadband data network in order to receive the data.

This enables the communications system 200 to avoid queuing and congestion at LMR sites 210, by using the broadband data network where appropriate to serve certain data instead of the trunked LMR network. For example, the LMR sites 210 may become busy due to a temporary situation (e.g. an emergency incident in the region defined by the LMR site), or can have a permanent heavy call load and a limited number of channels, such that it would be appropriate to route some data, where possible, via broadband networks if received group call data can be routed to the same targets via the alternative broadband network.

As discussed above, each LMR site 210 corresponds to a region defined by, for example, a coverage area of a trunked LMR base station associated with the LMR site 210. The plurality of LMR sites 210 thus correspond to several regions. FIG. 2 illustrates several adjacent LMR sites 210, and thus adjacent regions. However, a person skilled in the art will appreciate that the regions associated with the LMR sites do not need to be adjacent and can instead be disparate or overlapping.

The plurality of radios 205 can each be associated with an LMR site 210 by, for example, being in a region corresponding to the LMR site 210, or by actually connecting to and/or registering with a trunked LMR base station of the LMR site 210. Such association can be temporary, as radios of the plurality of radios 205 can be switched off of, or moved between, the LMR sites 210.

The plurality of radios 205 are grouped into talkgroups. The communications system 200 can include a plurality of talkgroups, wherein each talkgroup communicates separately. Talkgroups enable the communication system 200 to be used by different groups of radios, without the different groups of radios interfering with each other, and potentially for other purposes. As an illustrative example, a police service may communicate amongst a plurality of police radios using a first talkgroup, whereas a fire service may communicate amongst a plurality of fire radios using a second different talkgroup. Additionally, each of the plurality of radios 205 can be a member of a single talkgroup or of several talkgroups, and may receive data from any transmitting radio of a talkgroup to which the radio is a member.

In order to avoid congestion at an LMR site 210, the call controller can check if all radios that are associated with the talkgroup and the LMR site 210 are combined LMR-broadband devices 205b, and can thus be supplied group data by the broadband data network of the communications system 200. If so, the call controller can allocate resources of the broadband data network to the combined LMR-broadband devices 205b, instead of LMR resources, at a busy LMR site 210. Thus the broadband data network can be used instead of denying or queuing a call request because of congestion at the LMR site 210.

If the talkgroup has radios at other LMR sites 210, and these other LMR sites 210 have resources available for the call, the call controller can assign LMR resources to the radios at these other LMR sites 210. Thus the plurality of radios 205 can communicate with each other partly using the trunked LMR network and partly using the broadband data network.

As an illustrative example, the call controller can receive a group call request associated with radios at first, second and third LMR sites of the plurality of LMR sites 210. The call controller can determine that the first LMR site has no free LMR channels, but that both the second LMR site and the third LMR site do have free LMR channels. The call controller can then determine that each radio at the first site is a combined LMR-broadband device 205b and then assign LMR channels at the second and third LMR sites for the call request, while assigning broadband resources to radios at the first site. The group call could then be conducted over corresponding trunked LMR and broadband networks.

If, on the other hand, it is determined that at least one radio at the first site is an LMR-only device 205a, the group call is queued until LMR resources, e.g. a free LMR channel, become available to the LMR-only device 205a at the first site. Such queuing would also be required at the second and third sites if congestion would occur at these sites and these sites also include LMR-only devices 205a. Although the second or third site may also include combined LMR-broadband devices 205b, the presence of a single LMR-only device 205a in each of the sites is sufficient to prevent the use of broadband networks in each of the sites as well.

In the examples above, the plurality of radios 205 do not need to be associated with a person, but instead can, for example, describe an endpoint that is capable of being used by one or more people. Similarly, the LMR component 220a and the broadband PTT component 220b of the radio can comprise standalone components. As an illustrative example, an emergency vehicle can include an LMR component 220a and a broadband PTT component 220b, associated with the emergency vehicle, and potentially in different parts of the emergency vehicle.

As an alternative to, or in addition to the methods described above, the call controller can be used to efficiently utilize network resources. In particular, the call controller can determine if an LMR site 210 has a need to proactively preserve its LMR resources. In particular, the call controller can, for example, determine that LMR resources are likely to be needed in the future based upon a large number of LMR-only devices 205a at one or more LMR sites, either compared to a threshold value or relative to a smaller number of combined LMR-broadband devices.

In the case of the communications system 200 including several talkgroups at each LMR site 210, the call controller can identify talkgroups whose radios at the sites 210 are all combined LMR-broadband devices 205b. Resources of the broadband data network are then assigned to the combined LMR-broadband devices 205b that are members of these talkgroups, even at times when LMR resources are available at respective LMR sites 210.

Other criteria can be used to determine whether trunked (e.g., LMR) resources or broadband resources should be used for a group call, such as a number of radios associated with an LMR site 210. In such case, a small number of radios, such as under 50 or under 10, may be more efficiently served by the broadband data network, whereas a large number of radios, such as more than 10 or more than 50, may be more efficiently served via the LMR network.

As illustrated in FIG. 2, each radio includes an LMR component 220a, whereas only some radios include a broadband PTT component 220b. However, those of ordinary skill in the art will readily appreciate that other configurations are also possible including, for example, where some radios do not include an LMR component 220a.

Similarly, those of ordinary skill in the art will appreciate that a combined LMR-broadband device 205b may not have coverage of the broadband data network in some circumstances. In such case, the combined LMR-broadband device 205b can be handled in a similar manner to an LMR-only device 205a.

Figure 3:
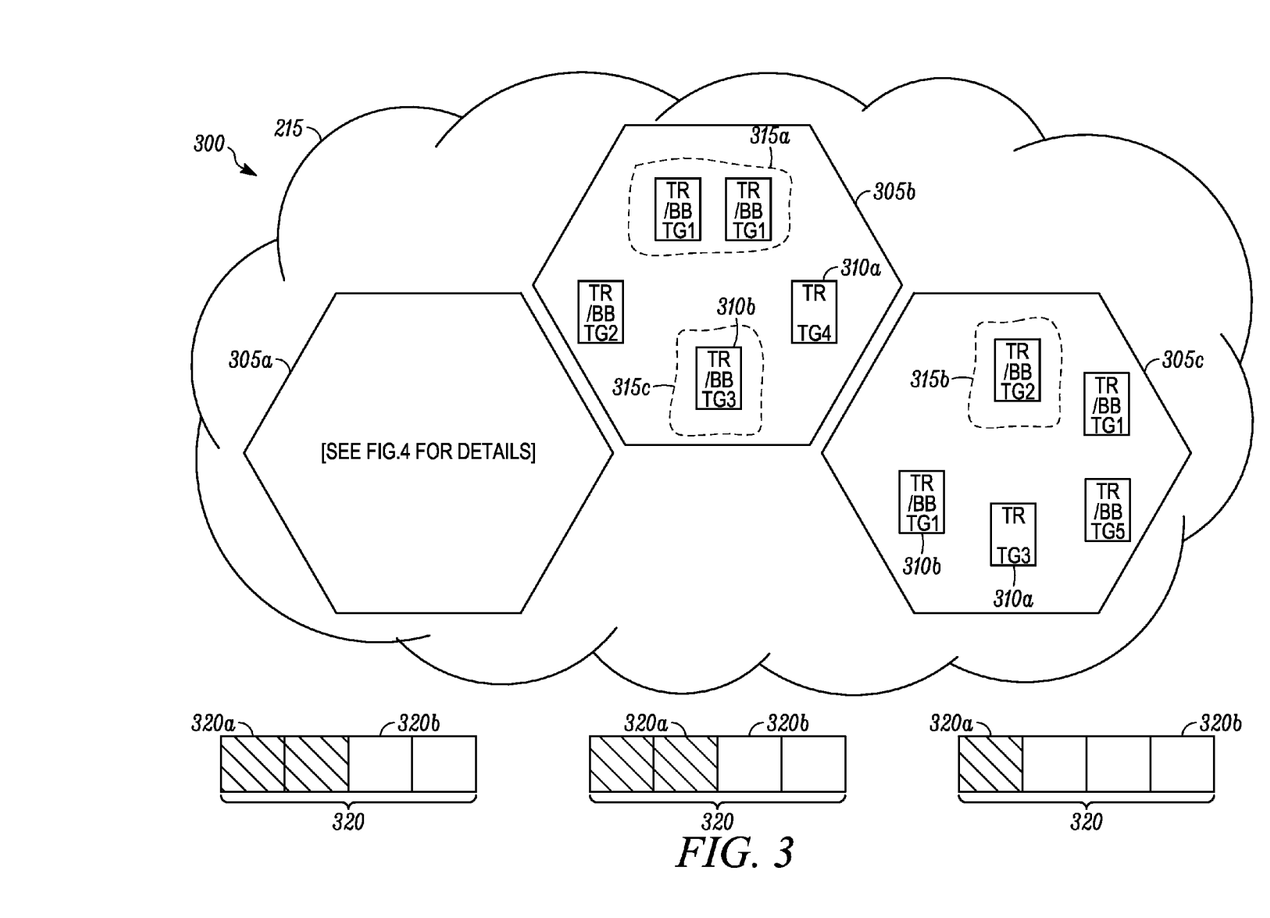
FIG. 3 is another diagrammatic illustration of a communications network, in accordance with some embodiments.
Figure 4:
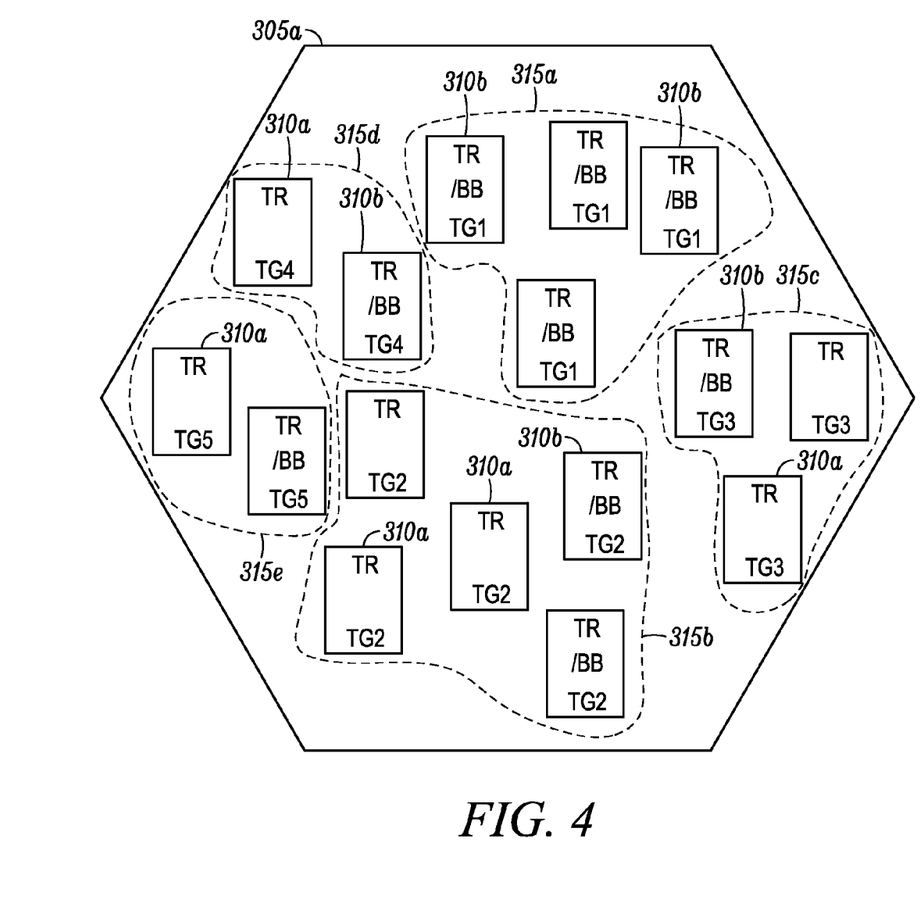
FIG. 4 illustrates a first site of the communications network of FIG. 3, in accordance with some embodiments.

FIG. 3 is a diagrammatic illustration of a communications system 300, according to an embodiment. The communication system 300 comprises a first trunked radio site 305a, a second trunked radio site 305b, and a third trunked radio site 305c. FIG. 4 is a detailed diagrammatic illustration of the first trunked radio site 305a.

The communications system 300 may be similar to the communications systems 100, 200 of FIG. 1 and FIG. 2 respectively.

Examples of trunked radio standards on which the first trunked radio site 305a, the second trunked radio site 305b, and the third trunked radio site 305c can operate include any one of a number of LMR systems, including, for example, the Terrestrial Trunked Radio (TETRA) Standard of the European Telecommunications Standards Institute (ETSI), Project 25 (P25) of the Telecommunications Industry Association (TIA) and ETSI's digital wireless communication device (DMR) Tier-2 Standard, which are incorporated by reference herein in their entirety.

Any of the TETRA standards or specifications or DMR standards or specifications referred to herein may be obtained by contacting ETSI at ETSI Secretariat, 650, route des Lucioles, 06921 Sophia-Antipolis Cedex, FRANCE. Any of the P25 standards or specifications referred to herein may be obtained by contacting TIA, 2500 Wilson Boulevard, Suite 300, Arlington, Va. 22201, United States.

Similar to FIG. 2, a broadband network coverage area 215 may overlay the trunked radio sites 305. Examples of broadband PTT standards that may operate within broadband network coverage area 215 include an open media alliance (OMA) PTT over cellular (OMA-PoC) standard, a voice over IP (VoIP) standard, or a PTT over IP (PoIP) standard. Typically, these protocols are implemented over broadband radio access network including, for example, LTE networks already set forth above.

Various pluralities of user devices are associated with each of the first trunked radio site 305a, the second trunked radio site 305b, and the third trunked radio site 305c. The pluralities of user devices include trunked radio only devices 310a, which can communicate by trunked radio and not broadband, and combined trunked radio and broadband devices 310b, which can communicate by either trunked radio or broadband.

The pluralities of user devices include a first group of devices 315a associated with a talkgroup 1 (TG1), a second group of devices 315b associated with a talkgroup 2 (TG2), a third group of devices 315c associated with a talkgroup 3 (TG3), a fourth group of devices 315d associated with a talkgroup 4 (TG4) and a fifth group of devices 315e associated with a talkgroup 5 (TG5).

As will be readily understood by a person of ordinary skill in the art, the pluralities of user devices can comprise similar or identical devices that are configured to operate on different talkgroups. In particular, each of the user devices 310a, 310b can include software or hardware which enables a selection of a talkgroup to which the user device is to be associated.

Each of the first trunked radio site 305a, the second trunked radio site 305b, and the third trunked radio site 305c includes a plurality of trunked traffic channels 320, the plurality of channels 320 including allocated channels 320a, and vacant channels 320b. The allocated channels 320a are channels that are currently allocated to a talkgroup for a group call, wherein the vacant channels 320b are channels that are available for allocation.

The first trunked radio site 305a has two allocated channels 320a and two vacant channels 320b. The second trunked radio site 305b has two allocated channels 320a and two vacant channels 320b, and the third trunked radio site 305c has one allocated channel 320a and three vacant channels 320b. In other words, all of the first trunked radio site 305a, the second trunked radio site 305b, and the third trunked radio site 305c have at least two vacant channels 320b.

The communications system 300 includes a call controller (not shown), such as the call controller 130 of FIG. 1, for managing network communication and for allocating network resources. The call controller can facilitate communication between trunked radio only devices 310a and combined trunked radio and broadband devices 310b operating in broadband mode or a trunked mode.

As discussed above, the first trunked radio site 305a has two free channels 320b, and therefore a new group call request on talkgroup TG1 can be processed using trunked radio at the first trunked radio site 305a. However, the first site 305a includes trunked radio only devices 310a that are associated with talkgroups 2-5. The presence of such trunked radio only devices 310a prevents talkgroups 2-5 from communicating via broadband, and thus makes these talkgroups reliant on trunked radio resources at the first trunked radio site 305a. In such case, the call controller can determine a potential future need for the trunked radio resources by other talkgroups at the first trunked radio site 305a based upon the number of talkgroups at the first trunked radio site 305a that rely on trunked radio communication. In this case, the group call request on talkgroup 1 can be served by broadband for those combined trunked radio and broadband devices at the first trunked radio site 305a, so as to reserve the trunked radio resources at the first trunked radio site 305a for future use by talkgroups 2-5.

Figure 5:
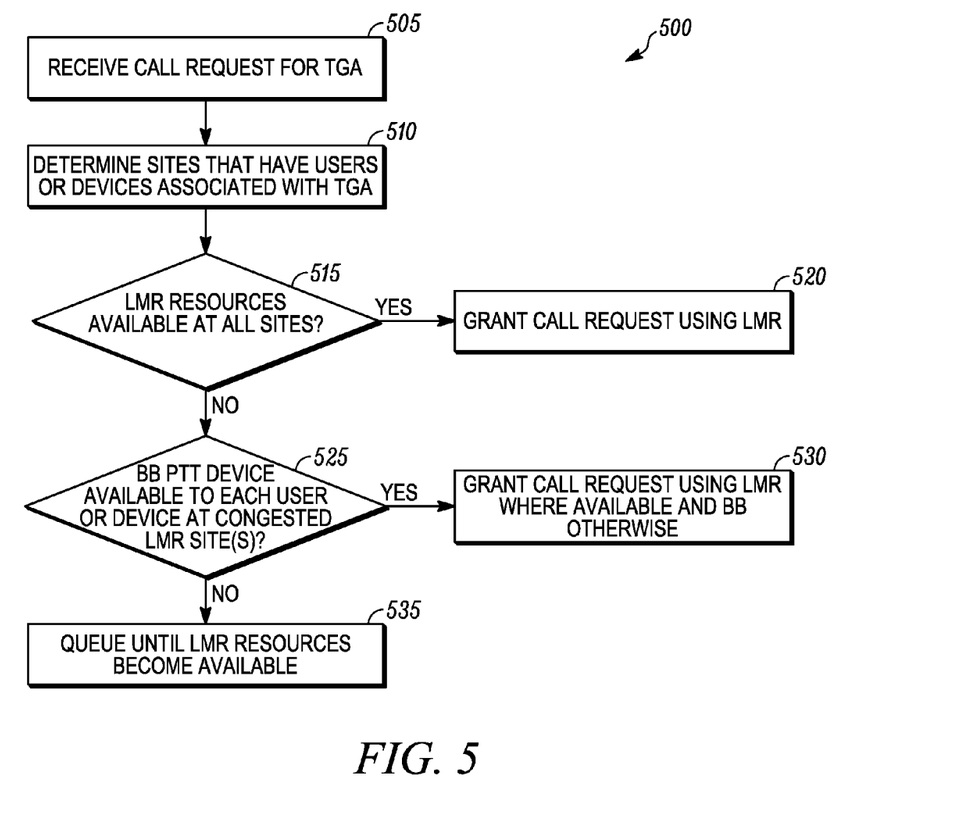
FIG. 5 illustrates a method of avoiding call queuing, in accordance with some embodiments.

FIG. 5 illustrates a method 500 of avoiding call queuing, according to an embodiment of the present invention. The method 500 can be operated by the call controller 130 of the communication system 100 of FIG. 1 to avoid congestion at trunked LMR base stations and corresponding LMR radio sites.

At block 505, a group call request for talkgroup 'A' is received. This can, for example, be the result of a user initiating a group voice call on a device associated with talkgroup 'A', or reception of data that is to be broadcast (e.g., supplied) to all members of talkgroup 'A'.

At block 510, it is determined which LMR sites have users or devices associated with talk group 'A'. Determining which LMR sites have users or devices associated with talk group 'A' can, for example, comprise first determining which users or devices are associated with talk group 'A', and secondly where each of these users or devices are located. The term user does not require a person be involved, but instead can comprise a device or set of devices, such as a set of devices associated with a vehicle or associated with some other entity.

At block 515, it is determined if LMR resources are available at all sites which have users or devices that are associated with talk group 'A'. This can, for example, comprise determining if at least one LMR channel is vacant at each of the LMR sites.

If LMR resources are available at all sites which have users or devices that are associated with talk group 'A', the call request may be granted using LMR in block 520. If LMR resources are not available in at least one site which has users that are associated with talk group 'A', i.e. at least one site is congested, it is determined if an associated broadband PTT device is available to each user or device at the at least one congested LMR site in block 525.

If an associated broadband PTT device is available to each user or device at the at least one congested LMR site, the call request is granted using LMR at sites which have LMR resources, and broadband for the users or devices at the at least one congested LMR site in block 530. If at least one user or device of the at least one congested LMR site does not have an associated broadband PTT device available, the group call request is queued until LMR resources become available to the at least one user or device, in block 535.

As discussed above, according to some embodiments, users may be allocated broadband resources even when LMR resources are available in order to preserve LMR resources. In such case, group calls can be granted using broadband where available, and LMR otherwise.

Figure 6:
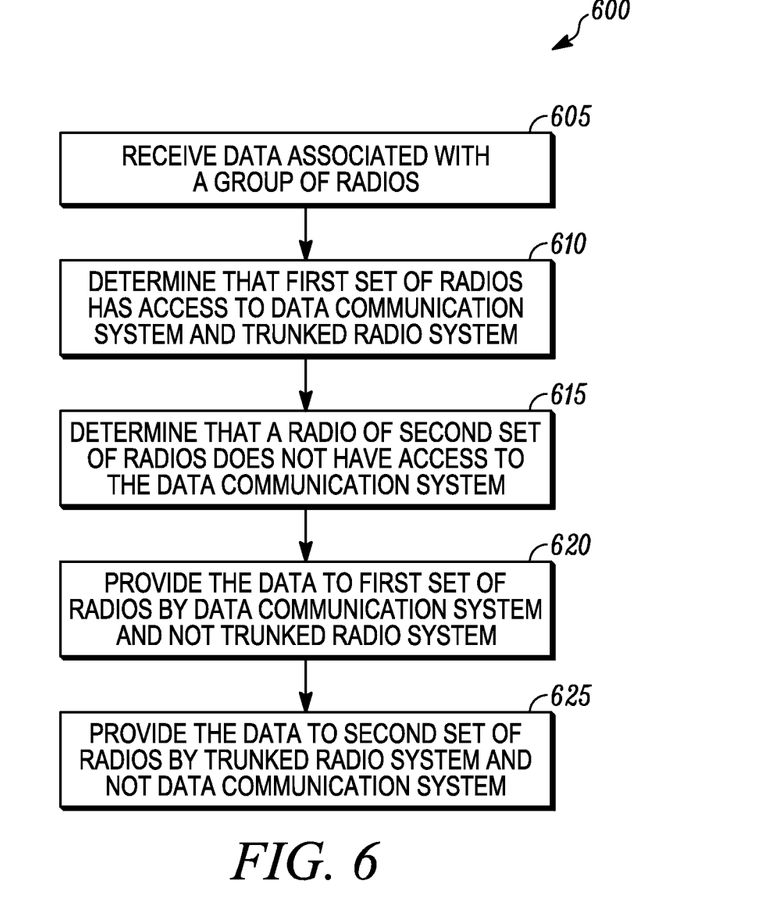
FIG. 6 illustrates a method of data communication, in accordance with some embodiments.

FIG. 6 illustrates a method 600 of data communication, according to an embodiment of the present invention. The method 600 can be operated by the call controller 130 of the communication system 100 of FIG. 1 to more efficiently utilize network resources across trunked and broadband radio systems.

At block 605, data associated with a plurality of radios is received. As discussed above, the data can comprise any of various data types, including voice data, image data, audio and/or video data. A first subset of the plurality of radios is located at a first location and a second subset of the plurality of users located at a second location. The first and second locations can, for example, comprise trunked radio sites, such as LMR sites. The data may be received via either of a broadband radio network or a trunked radio network, or may be generated at a console device coupled to a call controller via a wired connection.

At block 610, it is determined that each of the first subset of radios has access to both a broadband data communication system and a trunked radio system. The broadband data communication system can, for example, comprise a cellular broadband system, such as a 3GPP LTE system, and the trunked radio system can, for example, comprise an LMR system.

As discussed above, a user can have a single converged device that can communicate with both the data communication system and the trunked radio system, or separate associated trunked and broadband radio devices. Thus the term radio can include separate but associated broadband and trunked radio devices.

At block 615, it is determined that at least one radio of the second subset of radios does not have access to the broadband data communication system. The at least one radio can, for example, have a device that is capable of communicating with the broadband data communication system but is out of range of the broadband data communication system, or simply a device that is not capable of communicating with the broadband data communication system.

At block 620, the data is provided to the first subset of radios by the data communication system and not the trunked radio system.

At block 625, the data is provided to the second subset of radios by the trunked radio system and not the data communication system.

As will be readily appreciated by a person of ordinary skill in the art, the data can be provided to the first and/or second sets of radios in slightly different forms. For example, speech data can be encoded, compressed or transcoded prior to providing the speech data to the first and/or second set of users.

Figure 7:
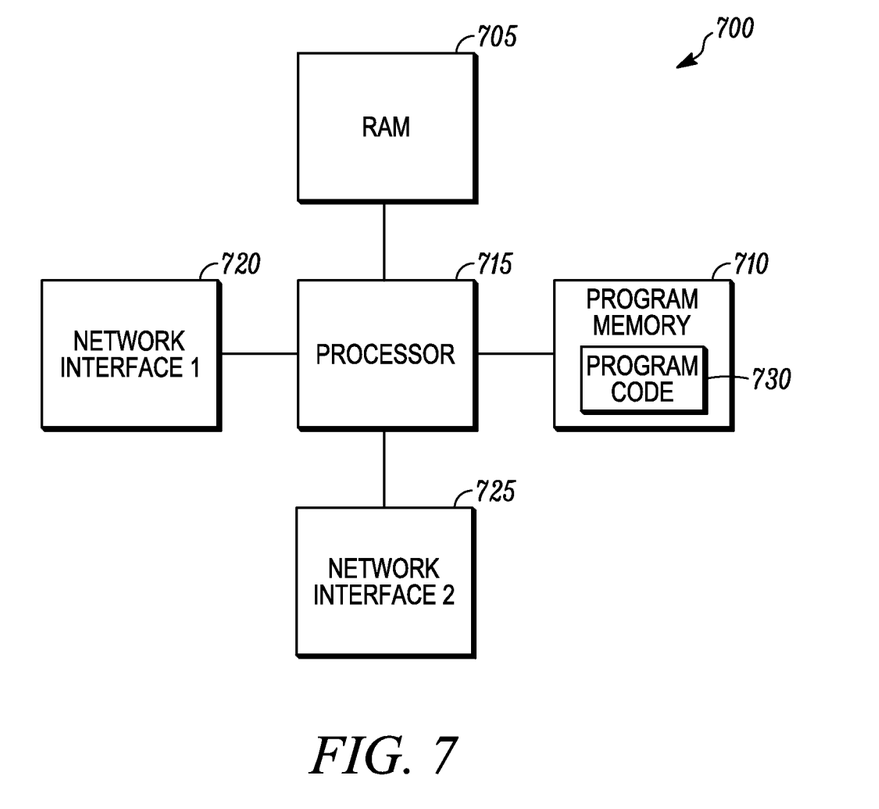
FIG. 7 illustrates a call controller, in accordance with some embodiments.

FIG. 7 is a block diagram of a call controller 700, according to an embodiment of the present invention. The call controller 130 of FIG. 1 can be similar or identical to the call controller 700. Similarly, one or more steps of the methods 500, 600 of FIGS. 5 and 6 can be implemented via the call controller 700.

The call controller 700 comprises a random access memory (RAM) 705 and a programmable memory 710 that are coupled to a processor 715. The processor 715 also has ports for coupling to network interfaces 720, 725. The network interfaces 720, 725 can be used to enable the call controller 700 to communicate with other devices in a network, such as a base station or a user device.

The programmable memory 710 can store operating code (OC) for the processor 715 and code for performing functions associated with call management. For example, the programmable memory 710 can store computer readable program code components 730 configured to cause execution of a method, such as the method 500 of FIG. 5 and/or the method 600 of FIG. 6, as described herein.

The call controller 700 can further comprise any additional elements necessary for the call controller 700 to perform additional desired functions.

The call controller 700 can comprise a collection of appropriately interconnected units or devices, wherein such units or devices perform, together, functions that are equivalent to the functions performed by the elements depicted in FIG. 7.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of data communication, comprising:
   receiving data associated with a group of radios, wherein a first subset of the group of radios is located within a first region and a second subset of the group of radios is located within a second region;
   determining, at a call controller, that the first subset of radios has access to both a broadband data communication system and a trunked radio system;
   determining that at least one radio included in the second subset of radios does not have access to the broadband data communication system; and
   allocating resources in the first region on the broadband data communication system and in the second region on the trunked radio system, and subsequently providing the data to the first subset of radios by the broadband data communication system and not the trunked radio system and to the second subset of radios by the trunked radio system and not the broadband data communication system.

2. The method of data communication of claim 1, wherein the trunked radio system comprises a Land Mobile Radio (LMR) system.

3. The method of data communication of claim 2, wherein the data communication system comprises a cellular broadband system.

4. The method of data communication of claim 2, wherein the first region comprises a first LMR site and the second region comprises a second LMR site.

5. The method of data communication of claim 2, wherein the group of radios is defined by an LMR talkgroup.

6. The method of data communication of claim 1, wherein allocating resources in the first region on the broadband data communication system is responsive to determining that the trunked radio system within the first region has insufficient available RF resources over which to provide the data to the first subset of radios.

7. The method of data communication of claim 1, wherein allocating resources in the first region on the broadband data communication system is responsive to determining a potential future need for the trunked radio system by a second group of radios in the first region.

8. The method of data communication of claim 7, wherein determining the potential future need for the trunked radio system comprises determining that at least one radio in the second group of radios does not have access to the broadband data communication system.

9. The method of data communication of claim 1, further comprising
   determining that a second group of radios in the first region has access to both the data communication system and a trunked radio system; and
   providing further data to the second group of radios by the trunked radio system.

10. The method of data communication of claim 9, wherein providing the data to the first subset of radios by the data communication system and providing the further data to the second group of radios by the trunked radio system is subsequent to determining that one or both of:
    the data communication system is more efficiently utilized by the first subset of radios; and
    the trunked radio system is more efficiently utilized by the second group of radios.

11. The method of data communication of claim 10, wherein the second group of radios comprises more radios than the first subset of radios.

12. The data communication method of claim 1, wherein determining that at least one radio does not have access to the broadband data communication system comprises determining that the at least one radio is not in a coverage area of the broadband data communication system.

13. The method of data communication of claim 1, further comprising:
    receiving a group call request associated with the group of radios;
    wherein the data associated with the group of radios comprises call data associated with the group call request.

14. The method of data communication of claim 13, wherein the group call request is associated with the group of radios by an LMR talkgroup.

15. The method of data communication of claim 1, wherein the call request is received from a radio in the second subset via the trunked radio system within the second region.

16. A data communication system comprising:
    a trunked radio system;
    a broadband data communication system;
    a data interface coupled to the trunked radio system and the broadband data communication system;
    a processor coupled to the data interface;
    a memory coupled to the processor, the memory including instruction code executable by the processor for:
      receiving data associated with a plurality of users or devices, wherein a first set of the plurality of users or devices is located within a first region and a second set of the plurality of users or devices is located within a second region;
      determining that the first set of users or devices has access to both the broadband data communication system and the trunked radio system;
      determining that at least one user or device of the second set of users or devices does not have access to the broadband data communication system;
      providing the data to the first set of users or devices by the broadband data communication system and not the trunked radio system; and
      providing the data to the second set of users or devices by the trunked radio system and not the broadband data communication system.

17. The data communication system of claim 16, wherein the trunked radio system comprises a Land Mobile Radio (LMR) system.

18. The data communication method of claim 16, wherein the broadband data communication system comprises a cellular broadband system.

19. A call controller comprising:
   a data interface;
   a processor, coupled to the data interface;
   a memory, coupled to the processor, the memory including instruction code executable by the processor for:
     receiving, on the data interface, data associated with a group of radios, wherein a first subset of the group of radios is located within a first region and a second subset of the group of radios is located within a second region;
     determining that the first subset of radios has access to both a broadband data communication system and a trunked radio system;
     determining that at least one radio included in the second subset of radios does not have access to the broadband data communication system; and
     allocating resources in the first region on the broadband data communication system and in the second region on the trunked radio system, and subsequently providing the data to the first subset of radios by the broadband data communication system and not the trunked radio system and to the second subset of radios by the trunked radio system and not the broadband data communication system.

* * * * *

UNITED STATES PATENT AND TRADEMARK OFFICE
CERTIFICATE OF CORRECTION

PATENT NO. : 9,042,929 B2
APPLICATION NO. : 13/971200
DATED : May 26, 2015
INVENTOR(S) : Nanthanael P. Kuehner

It is certified that error appears in the above-identified patent and that said Letters Patent is hereby corrected as shown below:

IN THE CLAIMS:

In Claim 12, Column 12, Line 23, delete "data communication method of" and insert -- method of data communication --, therefor.

In Claim 18, Column 13, Line 1, delete "method" and insert -- system --, therefor.

Signed and Sealed this
Twelfth Day of July, 2016

Michelle K. Lee
*Director of the United States Patent and Trademark Office*